(12) United States Patent
Strauss et al.

(10) Patent No.: US 9,291,278 B2
(45) Date of Patent: Mar. 22, 2016

(54) HOUSING FOR A PRESSURE-LOADED COMPONENT

(75) Inventors: Klemens Strauss, Frammersbach (DE); Frank Weis, Gemuenden (DE); Martin Walther, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 13/981,338

(22) PCT Filed: Feb. 1, 2011

(86) PCT No.: PCT/EP2011/000458
§ 371 (c)(1),
(2), (4) Date: Oct. 14, 2013

(87) PCT Pub. No.: WO2012/103899
PCT Pub. Date: Aug. 9, 2012

(65) Prior Publication Data
US 2014/0026983 A1    Jan. 30, 2014

(51) Int. Cl.
*F16K 11/07*    (2006.01)
*F16K 27/00*    (2006.01)
*F16K 27/04*    (2006.01)

(52) U.S. Cl.
CPC ............. *F16K 27/00* (2013.01); *F16K 11/07* (2013.01); *F16K 27/041* (2013.01); *Y10T 137/6851* (2013.01)

(58) Field of Classification Search
CPC ....... F16K 27/00; F16K 27/041; F16K 11/07; F15B 13/0402
USPC ...................................................... 137/625.2
See application file for complete search history.

(56) References Cited

U.S. PATENT DOCUMENTS

| | | | | |
|---|---|---|---|---|
| 3,557,824 A | * | 1/1971 | Krehbiel et al. | 137/375 |
| 4,715,407 A | * | 12/1987 | Aranovich | 137/625.65 |
| 6,068,288 A | * | 5/2000 | Karolek et al. | 280/735 |
| 6,095,177 A | * | 8/2000 | Machat et al. | 137/116.3 |
| 6,851,451 B2 | * | 2/2005 | Hoefling | 137/625.3 |

FOREIGN PATENT DOCUMENTS

| | | |
|---|---|---|
| DE | 21 58 325 | 5/1973 |
| DE | 2539483 A1 * | 3/1977 |
| DE | 195 27 892 A1 | 1/1997 |
| DE | 19527892 A1 * | 1/1997 |

(Continued)

OTHER PUBLICATIONS

International Search Report corresponding to PCT Application No. PCT/EP2011/000458, mailed Oct. 17, 2011 (German and English language document) (5 pages).

*Primary Examiner* — Marina Tietjen
*Assistant Examiner* — Seth W Mackay-Smith
(74) *Attorney, Agent, or Firm* — Maginot, Moore & Beck LLP

(57) ABSTRACT

A housing of a pressure-loaded component includes a pressure-loaded channel system which corresponds to the tensile and/or compressive strength properties of the housing material and to the tensile and/or compressive stresses in the housing material during operation of the pressure-loaded component. The housing also includes a channel rounded profile configured to be adapted to include a formed asymmetry. The formed asymmetry is configured to reduce tensile stresses occurring in operation and thus increase the load carrying capacity of the housing as a whole.

12 Claims, 3 Drawing Sheets

(56) References Cited

FOREIGN PATENT DOCUMENTS

| EP | 0076664 A1 * | 4/1983 |
| EP | 0 624 732 A1 | 11/1994 |
| EP | 1 304 476 A2 | 4/2003 |
| EP | 1304476 A2 * | 4/2003 |
| JP | 2001-248479 A | 9/2001 |

* cited by examiner

HOUSING FOR A PRESSURE-LOADED COMPONENT

This application is a 35 U.S.C. §371 National Stage Application of PCT/EP2011/000458, filed on Feb. 1, 2011, the disclosure of which is incorporated herein by reference in its entirety.

BACKGROUND

The present disclosure relates to a housing, preferably of a valve having rounded channel portions according to the description below.

In housings of components which are under hydraulic/pneumatic pressure, such as, for example, valves, there are generally formed pressure channels which can be opened and closed by means of valve coils or similar closure members. To this end, the closure members are displaceably accommodated in closure member chambers (valve bores) in which the pressure channels open. The opening locations form, during operation of the component, regions of high material stress in the housing and therefore constitute danger locations in principle for material fracture.

From the prior art, it is therefore known to construct the opening location of a pressure channel, for example, in the valve piston chamber (valve bore) of a sliding valve in such a manner that a peripheral groove in the housing is formed within the valve piston chamber in the operating range of a control edge of the valve piston and is connected to a fluid channel. However, the peripheral groove is not formed in an angular manner, but instead "rounded". That is to say that the peripheral groove assumes a semi-circular form in its cross-section (transversely relative to the peripheral direction), preferably having a radius=½ channel width, and has a constant radius over the entire periphery in cross-section. A notch effect in the region of the peripheral groove can thereby be reduced and consequently the durability of the component housing as a whole can be increased.

It should be noted at this point, however, that housings of mass-produced hydraulic components are generally in the form of a cast member, produced from a grey iron or an aluminum alloy, the materials used for this purpose having different properties of durability. Often, the compression strength and consequently the compression threshold strength are, for material reasons, considerably higher than the tensile strength and consequently the tensile threshold strength. Detailed tests by the Applicant of this disclosure have shown that in housings of the above-described type, in the region of the peripheral grooves during operation both tensile and compression loads occur simultaneously at different locations in the housing material, the maximum load of the housing reaching its limit in accordance with the material used in the tension-loaded region far more quickly than in the pressure-loaded region.

In view of these technical recognitions, the object of the disclosure is to develop the housing of a hydraulically/pneumatically pressure-loaded component in such a manner that the general hydraulic/pneumatic compression strength thereof can be increased without increasing the outer dimensions or housing wall thicknesses thereof. Furthermore, a method for producing such a housing is intended to be provided.

SUMMARY

This object is achieved with a housing of the generic type having the features described below and by a method having the method steps described below. The description below relates to other advantageous embodiments of the disclosure.

The notion of the disclosure consequently involves the rounded channel portion in the housing of a pressure-loaded component, for example, a valve, being adapted in accordance with the tensile/compression strength properties of the housing material and the stresses which occur in the housing material during operation, optionally with an asymmetrical portion being formed in the rounding path. More specifically, the rounded portion of the relevant groove-like channel guide does not receive in the peripheral groove cross-section and/or along the periphery of the groove and/or in the peripheral longitudinal groove section a radius or groove path which is in principle continuously the same and consequently symmetrical, but instead the rounded portion is adapted to the material stresses during operation established by analysis/calculation in such a manner as to reduce and/or also to increase load peaks in the more highly loaded regions. There is thereby optionally produced an individual asymmetry in the peripheral groove cross-section along the relevant peripheral groove (that is to say, with respect to the groove cross-section center axis) and/or along the periphery of the groove and/or in the longitudinal groove section, whereby the maximum material load limit under operating conditions can be increased, but for which no increase in the outer dimensions of the housing is required.

It is advantageous to construct only the pressure-loaded channel guides in a selective manner with asymmetrically shaped rounded portions since the greatest adaptation effect to the tensile/pressure load in the material can be achieved at these locations and the detection and production complexity remains the lowest in this instance.

It is further advantageous to construct the rounded channel portions for each channel guide in an individual, preferably different manner. Alternatively, however, it is also possible (optionally with an acceptable reduction of the adaptation effect) to standardize the rounded channel portions of the individual, comparably loaded channel guides in order to thereby reduce the production costs.

BRIEF DESCRIPTION OF THE DRAWINGS

The disclosure is explained in greater detail below with reference to a preferred embodiment and the appended drawings.

In the drawings.

DETAILED DESCRIPTION

Figure 2:
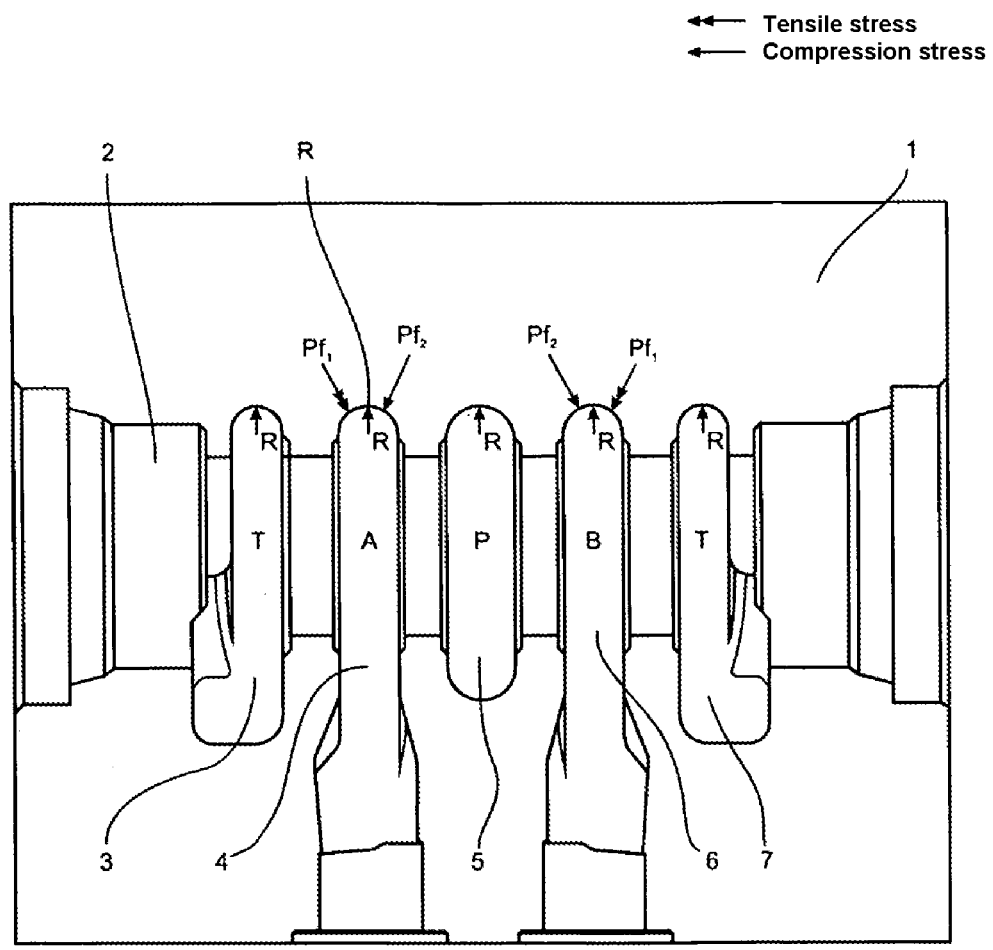
FIG. 2 is a partial longitudinal section through the housing of a directional sliding valve having the same structure as FIG. 1, but in accordance with a conventional construction type.

FIG. 2 shows a portion of the housing 1 of a conventional directional sliding valve as a possible example of a component which can be pressure-loaded and in which the subject-matter of the disclosure can be implemented. It is naturally also possible to use the disclosure, for example, in integrated hydraulic/pneumatic control systems in the form of control blocks, modules, etc., as components which can be pressure-loaded.

According to FIG. 2, the conventional directional sliding valve which is shown purely by way of example has the housing 1 in which a longitudinally extending valve bore (valve piston chamber) 2 is formed. The valve bore 2 serves in this instance to displaceably receive a valve piston or valve sliding member which is not shown in greater detail and on which a number of control edges are formed.

In the valve bore 2, there are formed with axial spacing from each other peripheral grooves 3 to 7, which are opened or closed (or optionally also partially opened) via the control edges of the valve piston which is not shown, depending on the axial position thereof. Housing bores (connection holes) TA, A, P, B, TB, via which the peripheral grooves 3 to 7 can be acted on with a hydraulic/pneumatic pressure or depressurized, open in the peripheral grooves 3 to 7.

In detail, in the present embodiment there are formed five peripheral grooves 3 to 7 along and in the valve bore 2, of which the three inner peripheral grooves 4, 5, 6 are each connected to connections which can be pressure-loaded (connection bores) A, P, B, and the two axially outer peripheral grooves 3, 7 are connected to a pressure relief connection (tank connection bores) TA, TB which leads to a tank which is not shown in greater detail. The two axially outer peripheral grooves 3, 7 are further in fluid connection with each other via an upper (or lower) channel bridge 8. In the comparison component known from the prior art according to FIG. 2, the peripheral grooves 3 to 7 are trough-like, that is to say, constructed in groove cross-section (transversely relative to the peripheral direction) over the entire periphery in a constant, semi-circular manner with a predetermined radius=½ channel width.

In conventionally established stress charts (for example, using expansion measurement strips or via finite element programs), it is possible to set out the stress distribution in the housing material during a simulated operation of the directional sliding valve according to the conventional structure. Consequently, owing to the known completely rounded portions of the peripheral grooves according to the illustration in FIG. 2, the smallest possible notch effects are achieved in principle, whereby the stresses in the housing material in the present test example could be limited in a predetermined (simulated) operating situation to a maximum of approx. 152 $N/mm^2$. The arrows which are indicated with the reference numeral Pf1 in FIG. 2 and which are drawn in the rounded region of the peripheral grooves 4 and 6 and are orientated substantially in the direction towards the cross-section halves of the peripheral grooves 4 and 6 facing the respective pressure-relief grooves 3, 7 indicate the locations with high tensile stress in the housing material. The arrows which are indicated with the reference numeral Pf2 in FIG. 2 and which are also drawn in the rounded region of the peripheral grooves 4 and 6 but which are counter to the arrows Pf1 with respect to the groove cross-section center axis indicate the locations with particularly high compression stress in the housing material.

From the operation which is simulated by way of example, a maximum hydraulic/pneumatic compression strength of the tested comparison housing according to FIG. 2 of approximately 400 bar has ultimately been achieved, which strength according to experience is sufficient statistically (including material fluctuations) to ensure a hydraulic/pneumatic compression strength of approximately 300 bar.

Figure 1:
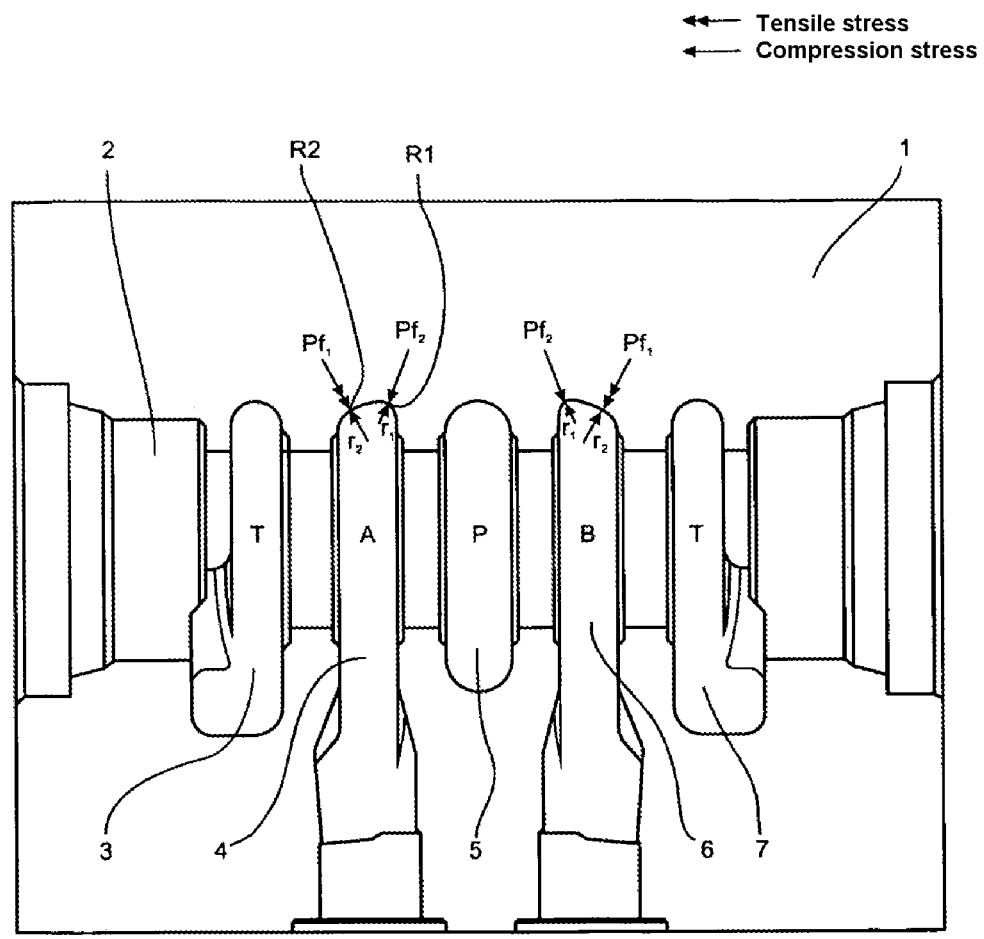
FIG. 1 is a partial longitudinal section through the housing of a hydraulically/pneumatically loaded component which is in the form of, for example, a directional sliding valve according to a preferred embodiment of the disclosure.

FIG. 1 also shows the directional sliding valve according to FIG. 2, but with a modification of the peripheral groove rounded portions according to the disclosure. All other technical configurations of the directional sliding valve according to the disclosure correspond to the above-described comparison valve of conventional structural type. Only the modification according to the disclosure will therefore be discussed below.

In specific terms, in the conventional valve according to FIG. 2 in the case of a simultaneous fluid pressure load (pulsing), in the three inner peripheral grooves 4, 5, 6 a housing breakage has occurred in the region of the two peripheral grooves 4, 6 directly adjacent to the two tank connections TA and TB. Consequently, in the present example according to the disclosure, these two peripheral grooves 4, 6, with respect to their rounded shape, received a cross-section geometry which is different from the conventional valve.

In other words, in the conventional test model and in the test model according to the disclosure in accordance with the present embodiment, GG30 (but GGG40 is also possible) having a tensile strength of 300 $N/mm^2$ and a compression strength of 960 $N/mm^2$ is used as a housing material. Therefore, in this generally conventional material, the compression threshold strength is significantly greater than the tensile threshold strength. Owing to a displacement of the channel rounded portions in the peripheral groove cross-section along the valve bore axis, that is to say, owing to the formation of the rounded channel portion by placing two circular segments with different radii in the peripheral groove cross-section (smaller radius r1 in the region of the compression stresses to be anticipated in the housing material, larger radius r2 in the region of the tensile stresses to be anticipated in the housing material), the hydraulic/pneumatic compression strength of the housing was able on the whole to be increased. In specific terms, the channel rounded portion in the peripheral groove cross-section (that is to say, transversely relative to the peripheral direction) according to FIG. 1 was deformed for the channels 3 and 6 (these peripheral grooves are in fluid connection with the connections A and B which can be pressure-loaded) by a cross-section portion of the channel having the radius r1 and the other cross-section portion of the channel having the radius r2 being rounded. The channel cross-section was thereby generally adapted in such a manner that it was possible to reduce the tensile stresses in the housing material (by increasing the groove radius r2 at an appropriate location, that is to say, at the groove cross-section half facing the pressure relief groove 3, 7 in each case) and at the same time to increase the compression stress in the housing material (by reducing the groove radius r1 at the appropriate location, that is to say, at the groove cross-section half facing away from the pressure relief groove 3, 7 in each case). The "asymmetrical" properties of the cast material used (permissible compression stress significantly higher than the permissible tensile stress) were used in an advantageous manner for this purpose.

In the simulated operation test with the component according to FIG. 1 (corresponding to the above-described operational test with the conventional component according to FIG. 2), it was possible to reduce the material stresses in the housing modified according to the disclosure to 118 $N/mm^2$ (in the conventional valve still 152 $N/mm^2$). The theoretical hydraulic/pneumatic compression strength of the housing modified according to the disclosure, owing to the use of the disclosure with the same outer dimensions and housing materials as the conventional valve were now 470 bar. This compression strength is sufficient to statistically (including material fluctuations) ensure a hydraulic/pneumatic compression strength of the housing of approximately 350 bar (that is to say, approximately 15% increased durability when the subject-matter of the disclosure is used compared with the conventional structure).

As can be seen clearly in FIG. 1, there is produced during the individual cross-section adaptation of the respective channel rounded portions in the peripheral grooves 4 and 6 which are connected to the connections A and B which can be pressure-loaded, a groove cross-section which is asymmetrical with respect to the groove cross-section center axis, whereas the rounded channel portion of at least the two tank channels (peripheral grooves) 3 and 7 and in this instance also the central channel (peripheral groove) 5 which is in fluid connection with the pressure connection P, remain symmetrical.

Figure 3:
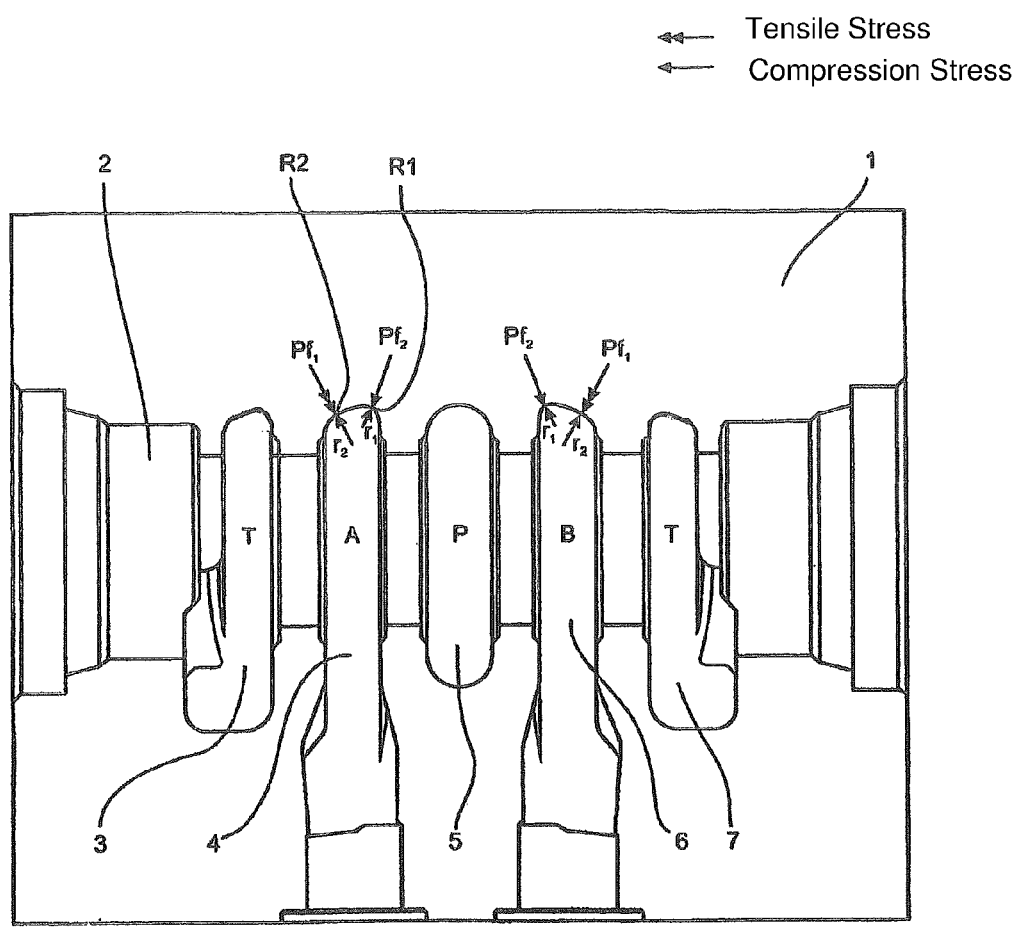
FIG. 3 is a partial longitudinal section through the housing of a directional sliding valve having the same structure as FIG. 1, but with asymmetric peripheral grooves.

Finally, it should be noted that the individual rounding of the groove cross-sections can be calculated based on models or established analytically in tests. During the individual adaptation of the channel rounding to the material stresses which actually occur, taking into account the different pressure/tensile durability of the housing material used, an asymmetry in the groove cross-section does not necessarily have to occur, as shown in the present example of channel 5. Instead or in addition, this is because it is also conceivable for the channel cross-section to change symmetrically and/or asymmetrically not (not only) in the transverse channel direction but also (instead) in the peripheral direction of the peripheral groove. Furthermore, it is practically possible for the two outer peripheral grooves 3 and 7 which are connected in fluid terms to the tank connections TA, TB and/or the centrally arranged peripheral groove 5 also to each have a rounded channel portion which is asymmetrical in the groove cross-section and which has two different radii with respect to the groove cross-section center axis, as depicted in FIG. 3.

The adaptation of the curvature paths or the occurrences of asymmetry to the prevailing stress progressions in the housing material may also lead to the rounded channel portions being constructed in an asymmetrical manner not only in the peripheral groove cross-section, but also or alternatively with respect to the longitudinal axis of the valve bore or in the peripheral direction of the respective peripheral groove (in the longitudinal groove section). Finally, the different radii r1, r2 for the channels 4 and 6 according to the present embodiment do not necessarily have to be the same but can instead assume different values for each channel.

LIST OF REFERENCE NUMERALS

1 Housing
2 Valve piston chamber
3 to 7 Peripheral grooves
8 Channel bridge
A, P, B Pressure connections
TA, TB Tank connections
r1, r2 Radii of the rounded channel portion
Pf1, Pf2 Material stress arrows

The invention claimed is:

1. A housing of a component which can be loaded with hydraulic or pneumatic pressure, comprising:
at least one pressure-loaded channel guide having a channel cross-section with a rounded channel portion configured to be at least partially asymmetrical in the channel cross-section,
wherein the rounded channel portion includes at least a smaller radius and a larger radius, the smaller radius formed in a region of the channel portion under established compression stresses and the larger radius formed in a region of the channel portion under established tensile stresses.

2. The housing as claimed in claim 1, wherein the channel cross-section is configured to change in a direction of a longitudinal channel in at least one of a symmetrical manner and an asymmetrical manner.

3. The housing as claimed in claim 1, wherein the channel cross-section is configured to remain the same over an entire channel length.

4. The housing as claimed in claim 1, further comprising:
at least one pressure-relieving channel guide having a channel cross-section with a rounded portion.

5. The housing as claimed in claim 4, wherein the rounded portion is configured at least partially in an asymmetrical manner in at least one of the channel cross-section and a longitudinal channel section of the pressure-relieving channel guide.

6. The housing as claimed in claim 4, wherein:
the housing is a housing of a directional sliding valve, the sliding valve having a valve bore configured to displaceably receive a valve sliding member and having a number of peripheral grooves configured to form the at least one pressure-loaded channel guide and the at least one pressure-relieving channel guide in a valve bore wall.

7. The housing as claimed in claim 6, wherein the respective cross-sections of the at least one pressure-loaded channel guide and the at least one pressure-relieving channel guide have the asymmetrical rounded portion.

8. The housing as claimed in claim 1, wherein the rounded portion of each of the at least one pressure-loaded channel guide and the at least one pressure-relieving channel guide in the channel cross-section is composed of at least two different radii.

9. A method for increasing hydraulic or pneumatic durability of a component housing having a pressure-loaded channel guide with channel cross-section profiles that are rounded in a longitudinal channel direction, comprising:
establishing operationally related material stresses along the pressure-loaded channel guide by at least one of analysis and calculation; and
adapting rounded channel portions such that tensile stresses established in the material are reduced and compression stresses established in the material are increased at the same time.

10. The method as claimed in claim 9, wherein:
the rounded channel portion in the channel cross-section of at least one selected pressure-loaded channel guide includes at least a smaller radius and a larger radius,
the smaller radius is formed in a region of the established compression stresses, and
the larger radius is formed in a region of the established tensile stresses.

11. The method according to claim 9, wherein the rounded channel portions of selected pressure-loaded channel guides are formed in an asymmetrical manner in a longitudinal channel cross-section.

12. The method as claimed in claim 9, wherein rounded channel portions of selected pressure-relieving channel guides are formed in an asymmetrical manner in at least one of a channel cross-section and a longitudinal channel cross-section.

* * * * *